Figure 1:
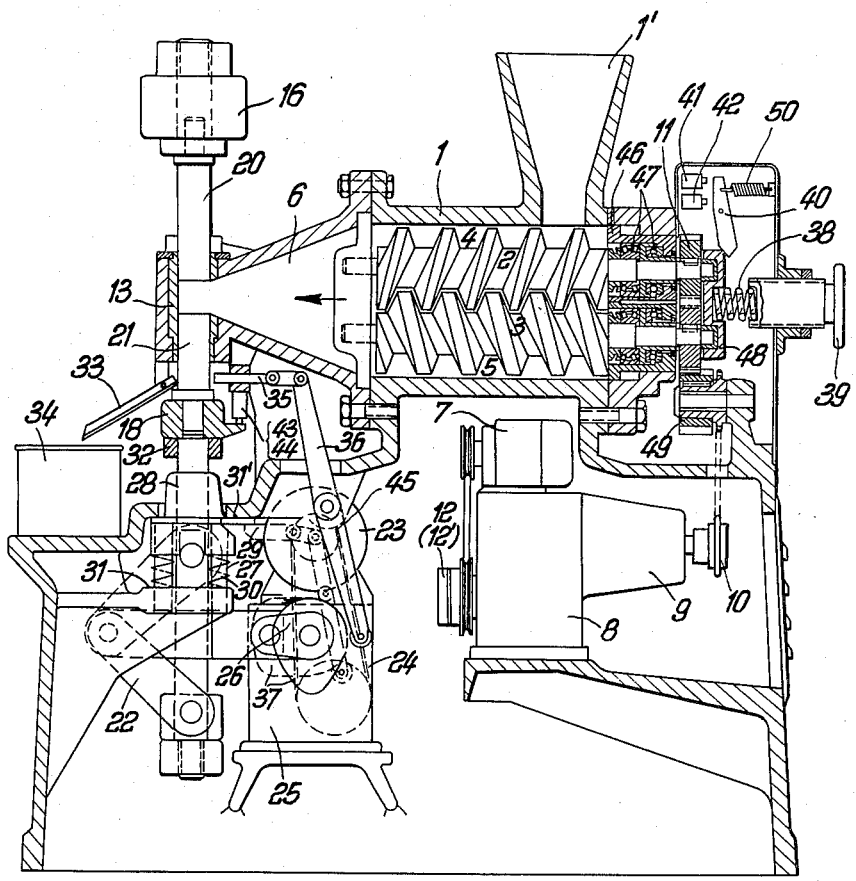

Aug. 22, 1961  E. R. KORSCH ET AL  2,996,756
TABLETING MACHINE
Filed July 11, 1958  6 Sheets-Sheet 1

Inventor:
EMIL RICHARD KORSCH
GÜNTER HERMANN KORSCH

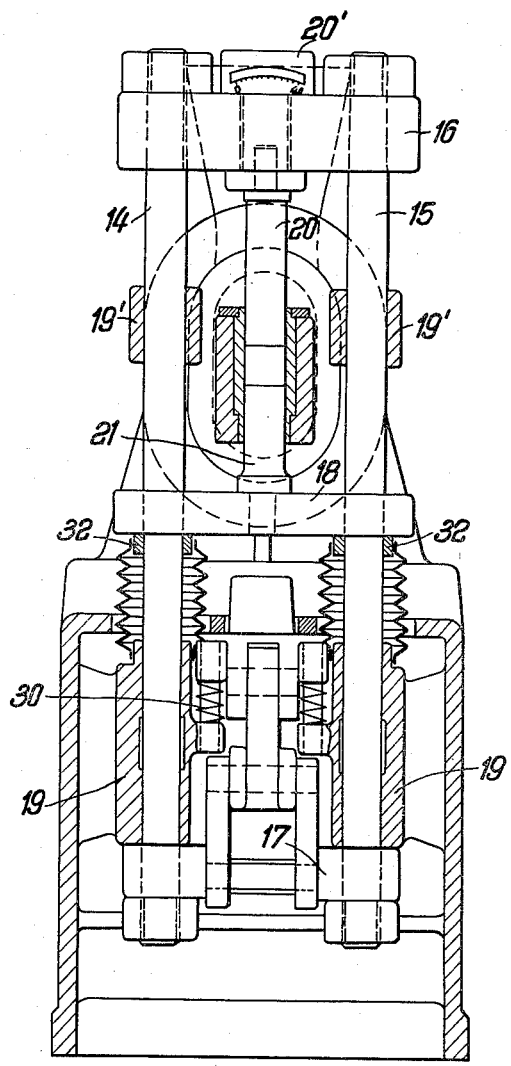

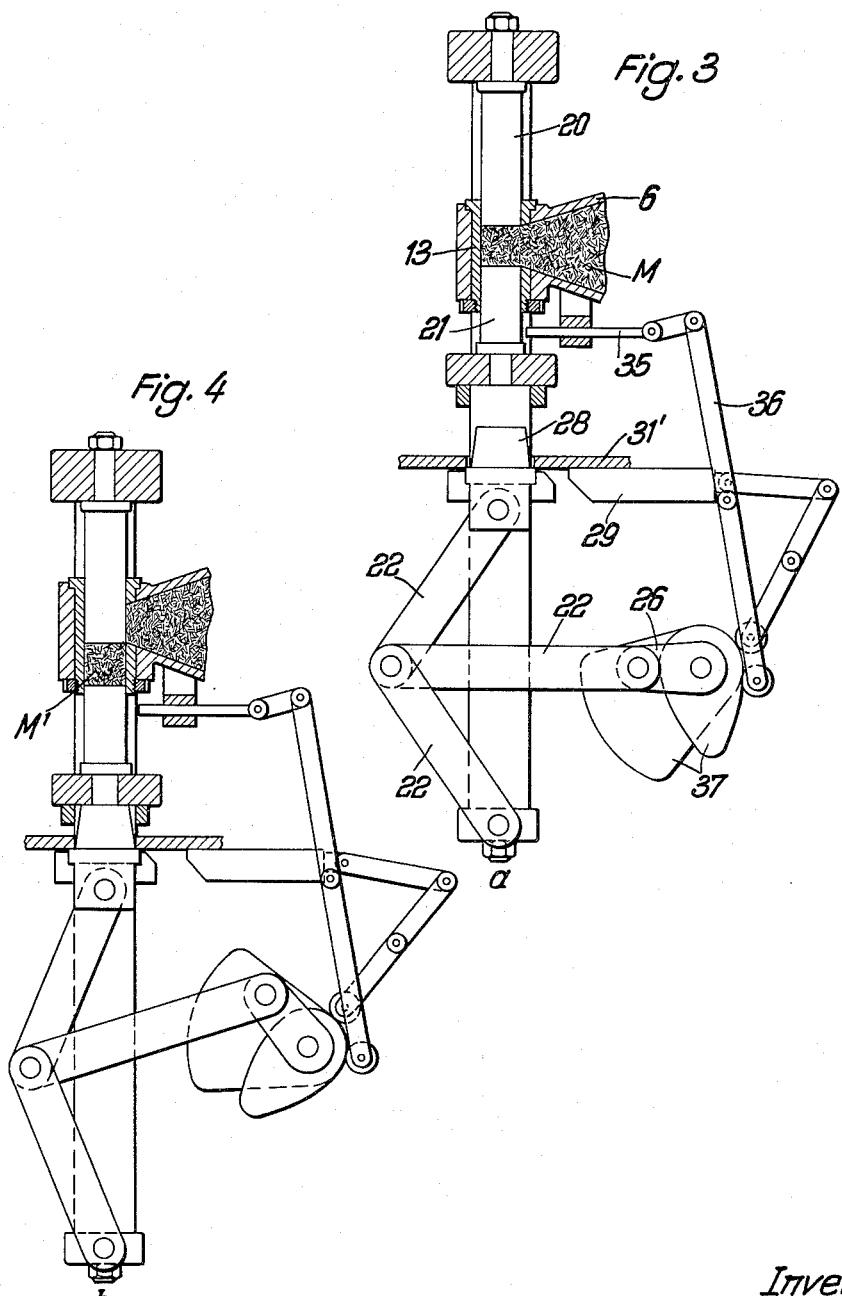

Aug. 22, 1961  E. R. KORSCH ET AL  2,996,756
TABLETING MACHINE
Filed July 11, 1958  6 Sheets-Sheet 4
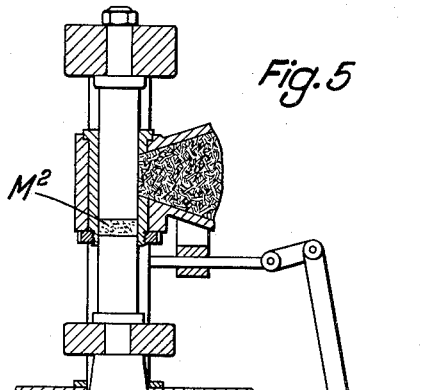
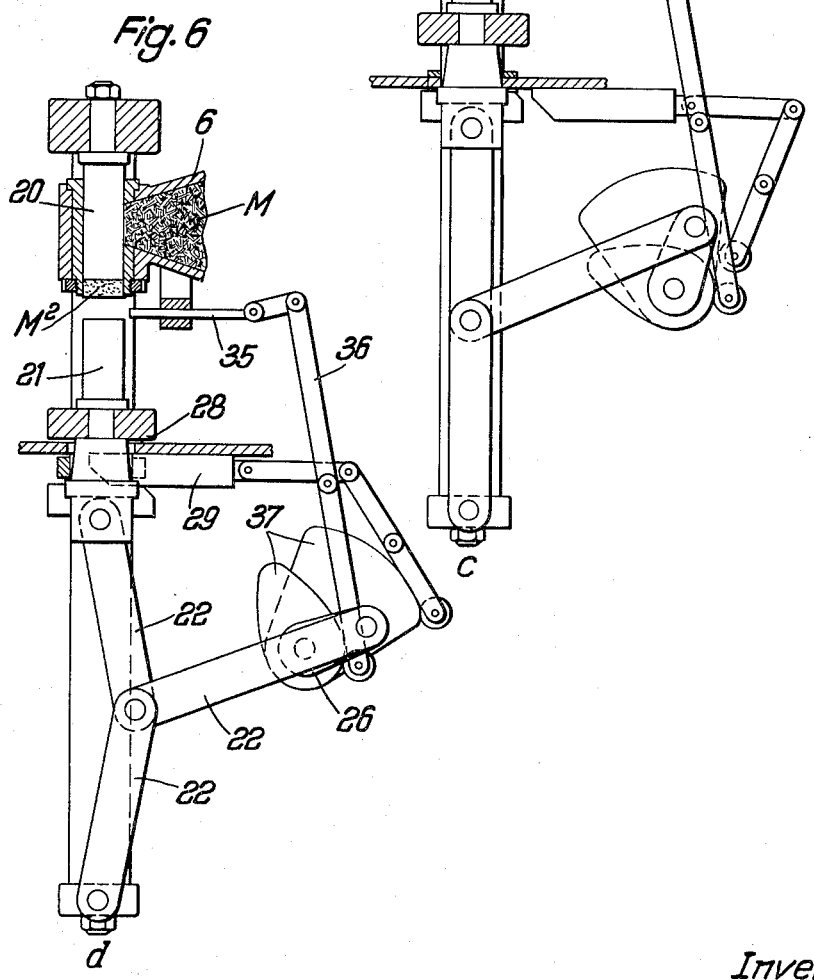
Inventor:
EMIL RICHARD KORSCH
y
GÜNTER HERMANN KORSCH

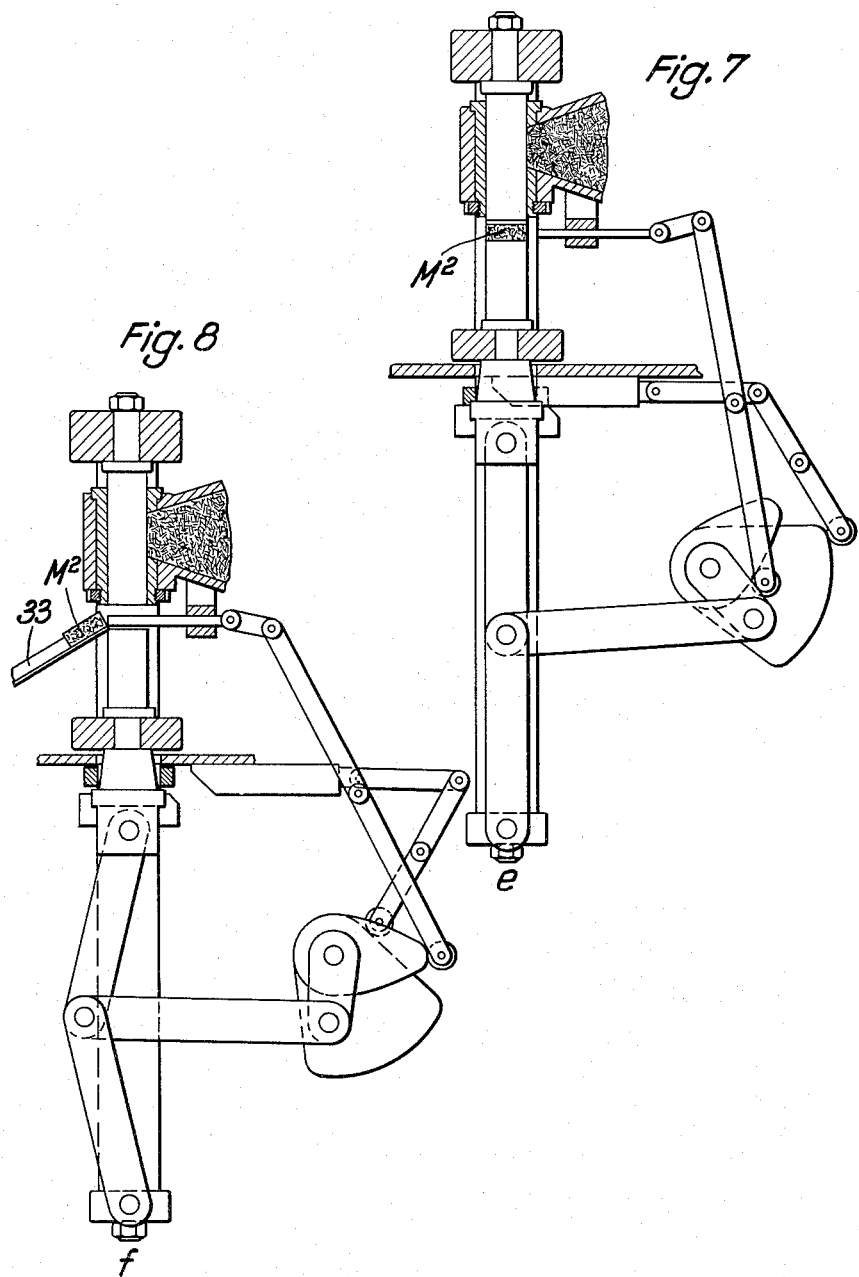

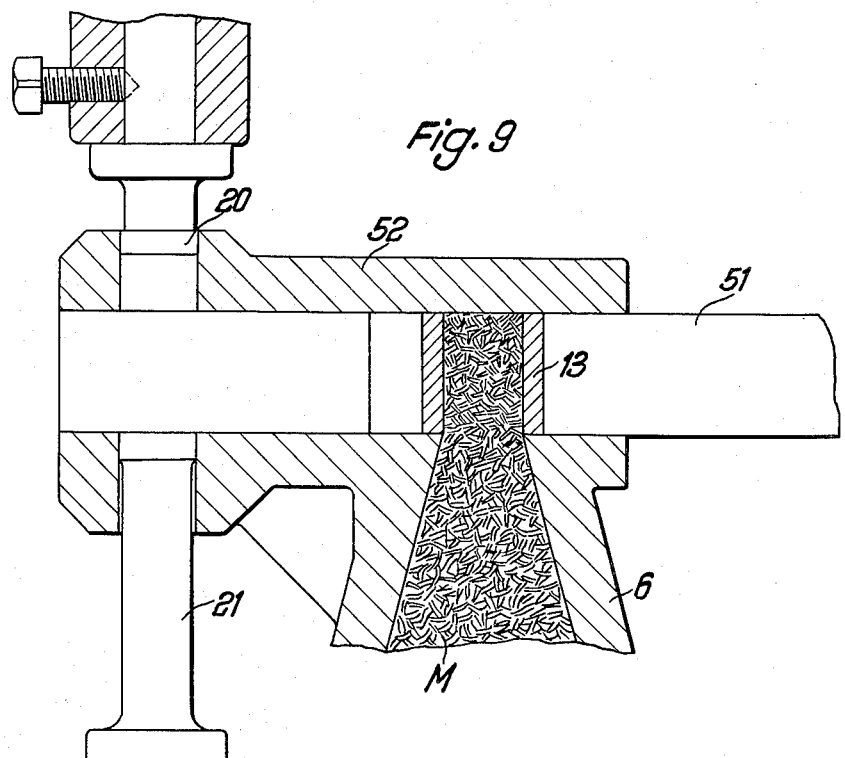
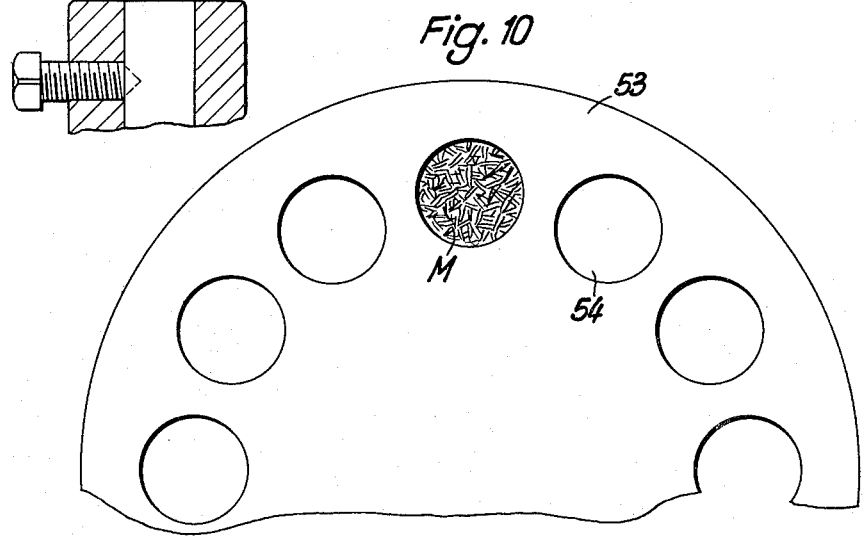

United States Patent Office 2,996,756
Patented Aug. 22, 1961

2,996,756
TABLETING MACHINE
Emil Richard Korsch and Günter Hermann Korsch, Berlin-Frohnau, Germany, assignors to Emil Korsch Spezialfabrik für Komprimiermaschinen, Berlin-Wittenau, Germany
Filed July 11, 1958, Ser. No. 748,006
Claims priority, application Germany July 12, 1957
10 Claims. (Cl. 18—5)

This invention relates to tableting machines, and is particularly directed to tableting machines for molding or compressing material containing fillers, such as plastic molding material, in which the molding material to be compressed is fed into a die by means of a filling device and compressed in the die by punches, after which it is ejected.

Tableting machines usually operate with filling or dosing equipment, which run across a die plate in which the die is fastened, moving across the open die cavity as soon as the upper punch has reached its top position and the die cavity is open, in order to fill it with the molding material, together with shaking motions, and, in part aided by stirring apparatus. During the return stroke of the filling apparatus the die cavity is leveled off, whereupon the upper punch moves down or the upper and lower punches move toward each other in order to compress the filled-in material, i.e. to compress it into a finished tablet. But when these filling apparatuses are employed the material to be processed must be present as a granular powder, thus being friable. On the other hand, it is impossible to process long-fibered or flaky material, such as synthetic, textile, and fabric shreds, or fillers, such as long-fibered asbestos, paper cuttings, etc. with tableting machines known at the present time. Up to the present time, it has been impossible to process such materials in automatic tableting machines, thus necessitating restorting to the makeshift of weighing the charges required for each molded part by hand, filling the die by hand and then pressing the tablet.

It is the object of the invention to avoid these disadvantages and to create a tableting machine that makes it possible to process synthetic, textile, and fabric shreds or other long-fibered or flaky fillers, which up to now could be filled into the die only after having been weighed out previously, in automatic operation. This problem is solved by having the die connected to a worm housing via a compressor chamber that tapers toward the die, with one or more worm conveyors mounted in this housing, their torque being adjustable to the given dosage pressure, as a result of which the material to be molded undergoes preliminary compression during the dosage procedure itself, appropriate switching devices that respond to the dosage pressure being provided for connecting the drive of the press punches.

Unless the drive of the worm conveyors is continuous, with very rapid strokes of the press punches, these switching devices can disconnect the drive to the worm conveyors temporarily even after preliminary compression has been achieved which is especially the case when larger molded parts are to be pressed.

Setting to a given torque can be effected by a torque clutch, and the switches responding to the molding pressure may be housed in a pressure dynamometer. It is also easy to design the worm conveyors so as to enable them to slide axially in the worm housing, so that they are under variable spring pressure and move axially when a certain dosage pressure is attained, thus actuating the switching devices that engage the punch drive or also disconnect the drive to the worm conveyors.

For automatic operation it is advisable to connect and disconnect the drives of the worm conveyors and the press punches alternately. This may be achieved by arranging contacts that are actuated by the movement of the press punches in their initial position, these contacts transmitting the switch-on impulse emitted by the switching devices, preferably the control contacts of the worm conveyors, to the press punch drive and switching the latter on for the operation required for pressing a molded part, disconnecting the press punch drive when the initial position is again reached, the control contacts of the worm conveyors no longer being actuated after the dosage pressure has disappeared, and again connecting the drive of the worm conveyors.

A particularly simple and easily housed mechanism for driving the press punches in automatic operation of the machine is a toggle linkage actuated by the crankshaft, which, on the one hand, acts upon the press punch drive, and, on the other hand, shifts a sliding step bearing support to limit the stroke of the bottom punch.

A preferable embodiment of the invention consists in having the toggle-action linkage pass through its fully extended position twice during one revolution of the crankshaft, with the step bearing support limiting downward travel of the lower punch before the toggle-action linkage reached its initial extended position, in having the pressing of the material take place in the initial extended position of the toggle-action linkage with the upper and lower punches moving further downward, after which the toggle-action linkage moves to a bent position opposite to the previous one, as the result of which the step bearing support moves downward, together with the lower punch, far enough for a cam mechanism to be able to slide a pressure plate into the resultant space between the step bearing support and the housing, whereupon the crank moves the toggle-action linkage to its second extended position, and the inserted pressure plate makes the upper punch emerge from the die, and in then having the cam mechanism withdraw the pressure plate, with the upper and lower punches moving apart as the toggle lever continues to move into the initial bent position, and an ejector actuated by a second cam pushing out the molded part, the upper and lower punches resuming their initial positions once the initial bent position has been reached.

The tableting machines covered by the invention can be used to compress any molding materials in automatic operation, in accurate doses and without spoilage, no matter whether they contain fillers or not, or whether the fillers are flaky or long-fibered, or whether flaky or long-fibered materials themselves, as well as moist or pasty materials are to be tableted.

Another advantage is that the use of a material previously compressed during dosage makes it possible to regulate the tablet weight in part without resetting the press punches, merely by using the preliminary pressure. When setting is made for a high preliminary pressure, the tablet weight is increased while, when setting is made for a low preliminary pressure, this weight is diminished.

Another important advantage is that it is not necessary to use the hitherto employed filling shoes or filling apparatus which move across a die plate to effect dosage, so that the material friction causes wear of machine parts as well as contamination of light-colored, sensitive molding materials. The worm conveyors and the feed housing are always firmly attached to the die. Another improvement is the dust-free mode of operation. Whereas in the known constructions the upper punch moves upward out of the die, freeing the die cavity for filling, after which it moves downward again, the entrance of the upper punch into the die whirling air and molding material dust out the die, in the machine of the present invention the punches continuously remain in the die for dosage and subsequent compressing, sealing the die at the top and the bottom.

Other advantages that follow from the preliminary compression are that only a comparatively small percentage of air has to be squeezed out of the molded material, which has already been subjected to preliminary compression and fed into the die, and the punch motion required to secure compact molded parts remain small, and that the pressed article is close to the edge of the die after final compression, thus requiring only a short distance for ejection. The short punch travel required makes it possible to design the drive in an extremely compact form, using a toggle-action linkage, which, on the other hand, possesses the advantage that the high pressures required to compress long-fibered or flaky material of a plastic or of a mixture of a textile and a plastic, or plastics containing other fillers, in accurate dosage can be achieved mechanically in a simple manner. Hydraulic control can also be used, of course, to actuate the press punches instead of the mechanical toggle action.

The subject of the invention is shown in the drawing in several embodiments;

FIGURE 1 showing a cross-section of the tableting machine;

FIGURE 2 showing a partial section of a side view of FIG. 1;

FIGURES 3–8 showing six different parts of the tableting cycle and the corresponding positions of the toggle action;

FIGURE 9 showing a modification of the feeder device, using a slide, and

FIGURE 10 showing a rotating table that can also be used instead of the slide in FIG. 9.

The material M to be compressed is fed to the worm conveyors 2 and 3 by the hopper 1' of the worm housing 1. Worm 2 is left-hand, and worm 3 right-hand. Constant advance is made possible by the opposite rotation of the worms. This seals off the filling chambers 4 and 5 and ensures continuous advance of the material to the compression chamber 6. One or more worms can also be used, for example. The worms can be driven, for example, by the motor 7 through a variable-speed drive 8 in series with the planetary gearing 9. Here the chain drive 10 takes over the drive of the gears 11 mounted on the worm shafts. These gears turn the worms. The preliminary compression of the material in the compression chamber 6 can be governed by the variable speed of the worms and by an adjustable torque coupling 12'. The worms are set in motion by controls to be described later as soon as the die cavity is opened. Once the set preliminary compression in the die has been attained, the worms are stopped automatically. At a high rate of strokes the worms can also be made to operate continuously without stoppage. In the portion of the cycle (FIG. 3) the material is forced into the die 13 from the compression chamber 6. The pillars 14 and 15 are rigidly connected together through the head 16 and the base 17; they support the moving crosspiece 18 and slide in the bearings 19, 19'. The head 16 supports the upper punch 20 with its built-in pressure dynamometer 20'. The crosspiece 18 supports the lower punch 21. The pressure is produced by the toggle-lever action 22. The entire system is actuated by motor 23 through a V-belt drive 24 and a gear box 25.

The rotating motion of the crankshaft 26, driven by the gearbox 25, bends and extends the toggle-lever action 22. The throw of the crankshaft is dimensioned so that the toggle-lever is moved beyond its extended position, passing through dead center twice during one revolution of crankshaft 26. The initial extension movement moves the pillars 14 and 15 downward, together with the head 16 and the upper punch 20. During this downward motion the material $M^1$ in the die 13 is cut off. The lower punch 21 mounted on the crosspiece 18 traverses the same distance (cycle portion b, FIG. 4). The material is cut off in the die 13. In this position the crosspiece rests upon the step bearing support 28, which is connected to the toggle-lever system 22 and slides against the pressure of springs 30 on the guide rods 27 fastened in the stationary lugs 31 of the machine housing and interrupts the downward motion of the lower punch 21, whereas the upper punch together with the pillars and the setting rings continues to move downward until the toggle lever reaches its extended position. The stopping of the lower punch 21 and the continued movement of the upper punch compresses the material as in cycle portion c (FIG. 5). The molded piece is denoted by $M^2$. Further rotation of the crankpin then bends the toggle lever 22 into the opposite bent position, thus moving the step bearing support 28, which is mounted on slides, further downward. Once the bottom position of the bearing support 28 has been reached, the pressure plate 29, controlled by the double cam 37, will have been pushed between the step bearing support and the bearing surface 31'. The insertion of the pressure plate then causes the entire frame system, with the upper and lower punches, to move further downward, through a distance equal to the thickness of the pressure plate as the toggle lever is extended. This further downward motion effects the ejection the molded part from die 13 in cycle portion d (FIG. 6). The toggle lever is then bent from its second extended position back to its initial position. The upper punch is raised, and the molded part lies free on the lower punch in cycle portion e (FIG. 7). Since the lower punch remains in its position until the setting rings fastened to the tie rods rise, the molded piece can be pushed off. This is done by the push rod 35, which is atcuated by the lever arm 36 and controlled by the cam 37. The molded part slides down the discharge plate 33 into the stock bin 34, in accordance with the cycle portion f (FIG. 8). The push rod 35 is returned to its initial position together with the pressure plate 29, controlled by the cam 37. A mechanical or hydraulic device may be employed to return the frame system to its initial position instead of the spring 30, especially if the weight of the frame system becomes too great. Further bending of the toggle lever raises the tie rods further, the setting rings 32 reach the crosspiece 18 and lift it with them. The entire frame system is returned to its initial position. The die cavity is open and the new filling commences.

Dosage of the die filling can be regulated by the dosage pressure. This is effected either by the torque coupling 12' mentioned above or by one or more compression springs 38, which press against the worm conveyors that are axially displaceable within the worm housing 1 and move the journal box 46 for the radial and axial bearings into the left-hand end position shown in the drawing, from which, once the set feed pressure has been reached, the journal box can move to the right together with the worm driving gears 11, which then slide along the wider gear 49 of the chain drive 10. Only one compression spring 38, which acts upon the pressure cup 48, is shown in the embodiment in the drawing, the axial displacement of this cup moving lever 40 against the action of the return spring 50, the deflection of this lever actuating the contact switches 41 and 42.

Limit switch 43 opens the circuit to the magnetic coupling 45 and stops the motion of the press. The switch 44 closes the circuit of the magnetic coupling 12 and starts the worm conveyors going. The precompressed molding material is forced into the exposed die cavity, and the fore-pressure drops. This decrease of fore-pressure allows the compression springs 38, whose pressure can be regulated by means of the handwheel 39, to move the worms together with their bearings in the direction of the arrow. Once the die is filled with molding material, the fore-pressure rises, and the worms with their bearings move in a direction contrary to that of the arrow, swinging the switching lever back so that it actuates contacts 41 and 42. Contact 41 opens the circuit of the magnetic coupling 12, while contact 42 closes the circuit of the magnetic coupling 45. The worm conveyors come to a stop, and the press begins to operate.

Modified embodiments for feeding the precompressed material that is in the die 13 to the press punches 20 and 21 are shown in FIGS. 9 and 10. In FIG. 9 the die 13 is located in the slide 51, which moves in the housing 52 at right angles to the direction of motion of the press punches. The guide housing 52 is part of the compression chamber 6. The to-and-fro motion of the slide 51 is likewise actuated by a cam. Instead of the slide 51, the rotating table 53 shown in FIG. 10, such as is known in tableting machines and possessing several openings 54 to take the molding material M, can also be used. The rotating table turns intermittently past the compression chamber 6. The worm conveyors 2 and 3 force the precompressed and dosaged molding material into the opening 54 that is in the operating position, which then serves as a die, the finished molding part being brought underneath the press punches 20 and 21 elsewhere and being ejected later as rotation of the table continues.

What is claimed is:

1. A tableting machine for compressible materials such as loose plastic molding materials containing fibrous or flaky fillers comprising a cylindrical die having a side admission port and punch means consisting of two separate co-axial piston punches movable axially and reciprocably in the die from the respective ends, means for feeding a predetermined dose of said material to the die and precompressing said material during the feeding of the same, means for moving said punch means in said die for further compressing said material into a tablet and for then separating said punches to release the tablet and to move said tablet out of the die, means for ejecting said tablet from said machine, driving means for driving the punch moving means, the feeding means and the ejecting means in a predetermined timed relationship, and means responsive to a predetermined amount of precompression for controlling the driving means to stop the driving of the feeding means and initiate actuation of the punch means.

2. A machine according to claim 1, wherein the feeding and precompressing means comprises a housing having worm conveyor means therein and a precompression chamber tapering from said housing toward said die, and regulating means connected to the feeding and precompressing means for adjusting the amount of precompression, said regulating means includes means for adjusting the driving torque of the worm conveyor means.

3. A machine according to claim 1 including a movable table, said die being located in said table and means for moving said table to shift the die from the feeding means to the punch means.

4. A machine according to claim 1, wherein the feeding and precompressing means comprises a housing having worm conveyor means therein and a precompression chamber tapering from said housing toward said die, and regulating means connected to the feeding and precompressing means for adjusting the amount of precompression, said regulating means comprising coupling means between the worm conveyor means and the drive means including an adjustable torque coupling and variable-speed coupling.

5. A machine according to claim 1 wherein said die is a cylinder and said punch means includes an upper punch and a lower punch in said cylinder; said driving means including an electric motor and coupling means connecting said motor to said punches and said ejecting means, said coupling means including camming means connected to said motor and a toggle linkage connected between said camming means and said punches; said coupling means being connected to said punches for moving them downward together a given distance and then moving the upper punch downward more rapidly than the lower punch to compress the material and thereafter moving the punches apart and actuating the ejecting means to remove the tablet from the space between the punches.

6. A machine according to claim 1, wherein said die is a cylinder and said punch means includes an upper punch and a lower punch in said cylinder; the driving means including an electric motor and coupling means connecting said motor to said punches and said ejecting means, said coupling means including camming means connected to said motor and a toggle linkage connected between said camming means and said punches; said camming and coupling means being connected to move said punches downwardly together a given distance, then move the upper punch downwardly more rapidly than the lower punch to compress the material and form it into a tablet, and then move the punches at different rates until the upper punch removes the tablet from the die and deposits it on the lower punch with the punches separated a distance greater than the thickness of the tablet, and thereafter actuating the ejecting means to remove the tablet from the space between the punches.

7. A tableting machine for pre-forming material such as the raw molding material of synthetic plastics containing fibrous or flaky fillers into tablets, comprising a housing having worm conveyor means therein and bearing and guiding means for rotary and axial movement of the worm conveyor, an adjustable compression spring positioned to be compressed by the axial movement of the worm conveyor thereagainst in response to a predetermined amount of pre-compression of said materal, a punch press, means for driving the worm conveyor means, means for driving the press, switching means positioned to respond to the axial movement of said worm conveyor means for disconnecting the worm conveyor drive means and starting the press drive means, said press including a die cylinder having an inlet opening communicating with said worm conveyor means, said press including two plunger punches in said die cylinder for further compressing a predetermined dose of said pre-compressed material, said cylinder having an axial exit opening at the end thereof, coupling means connected to said press drive means for moving said plungers in the same direction and maintaining their distance substantially constant and closing said inlet opening by means of a first of said plungers, and then moving said first plunger with respect to the other plunger for compressing said material into a tablet, then moving the second plunger out of the die cylinder, said coupling means then moving the first plunger forwardly until it ejects the tablet from said cylinder onto the second plunger, a push rod, means connected to said press drive means for moving said push rod transversely of said cylinder for pushing the tablet off said second plunger and thereafter returning the push rod to its initial position outside the path of said plungers, said means for moving said plungers thereafter returning both plungers to their initial positions, and switching means connected to said driving means and positioned to respond to the initial position of the plungers for stopping the press drive means and starting the worm conveyor drive means.

8. A tableting machine according to claim 7, wherein said plungers are an upper punch and a lower punch, said means for actuating the plungers including a toggle action linkage and camming means for driving said linkage, means for limiting the downward travel of the lower punch before the toggle action linkage has reached its initially extended position, said toggle linkage being connected so as to thereafter continue moving the upper punch downward to compress the material until the linkage reaches its initial extended position, said toggle linkage being formed to be bent to a position opposite to that which it had before its initial extended position and being connected to the limiting means for moving it downward together with the lower punch, said linkage and camming means being connected to thereafter move the upper punch downward until the compressed material is ejected from the die cylinder in response to the toggle linkage again reaching an extended position, said toggle linkage thereafter moving the upper and lower punches apart.

9. A tableting machine according to claim 7, wherein said plungers are an upper punch and a lower punch, said means for actuating the punches and the push rod including toggle action linkage and camming means for actuating said linkage, means for limiting the downward travel of the lower punch before the toggle action linkage has reached its initially extended position, said toggle linkage being connected so as to thereafter continue moving the upper punch downward to compress the material until the linkage reaches its initial extended position, said toggle linkage being formed to be bent to a position opposite to that which it had before its initial extended position and being connected to the limiting means for moving it downward together with the lower punch, additional means connected to operate in timed relation with said toggle means for thereafter moving the upper punch downward until the compressed material is ejected from the die cylinder in response to the toggle linkage again reaching an extended position, said toggle linkage thereafter moving the upper and lower punches apart.

10. A machine according to claim 1 wherein the feeding and precompressing means comprises a housing having worm conveyor means therein and a compression chamber tapering from said housing toward said die, regulating means connected to the feeding and precompressing means for causing an axial movement of said worm conveyor means in response to a predetermined amount of precompression, and switch means positioned to be actuated by the axial movement of said worm conveyor means for stopping the drive of the worm conveyor means and initiating the actuation of the punch means in response to a predetermined amount of precompression, and further including switching means responsive to the initial position of the punch means for actuating the driving means to start the driving of the worm conveyor means and stop the driving of the punch means.

References Cited in the file of this patent

UNITED STATES PATENTS

| 2,474,136 | Wilson et al. | June 21, 1949 |
| 2,484,005 | Alberti | Oct. 11, 1949 |
| 2,505,540 | Goldhard | Apr. 25, 1950 |
| 2,666,229 | Vogt | Jan. 19, 1954 |
| 2,705,835 | Massmann | Apr. 12, 1955 |